United States Patent
Bemel-Benrud et al.

(10) Patent No.: US 11,042,278 B2
(45) Date of Patent: *Jun. 22, 2021

(54) PROVIDING GRAPHICAL INDICATION OF LABEL BOUNDARIES IN DIGITAL MAPS

(71) Applicant: Mapbox, Inc., San Francisco, CA (US)

(72) Inventors: Saman Bemel-Benrud, Washington, DC (US); Thomas Christopher MacWright, San Francisco, CA (US); Eden Halperin, San Francisco, CA (US)

(73) Assignee: Mapbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,045

(22) Filed: Sep. 13, 2019

(65) Prior Publication Data

US 2020/0012416 A1  Jan. 9, 2020

Related U.S. Application Data

(63) Continuation of application No. 15/681,290, filed on Aug. 18, 2017, now Pat. No. 10,474,340.

(Continued)

(51) Int. Cl.
*G06T 11/60* (2006.01)
*G06T 11/20* (2006.01)
(Continued)

(52) U.S. Cl.
CPC ....... *G06F 3/04847* (2013.01); *G01C 21/367* (2013.01); *G06F 3/0482* (2013.01); *G06F 3/0486* (2013.01); *G06F 3/04845* (2013.01);

*G06F 16/2379* (2019.01); *G06F 16/287* (2019.01); *G06F 16/29* (2019.01);
(Continued)

(58) Field of Classification Search
None
See application file for complete search history.

(56) References Cited

U.S. PATENT DOCUMENTS 8,274,524 B1   9/2012  Cornell et al.
8,937,627 B1   1/2015  Otero et al.
(Continued)

OTHER PUBLICATIONS

ArcMap, "Symbolizing Data with ArcMap," Geography 205 Class Material by T Millett, at <https://www.mtholyoke.edu/courses/tmillett/course/geog205/files/Symbolizi ng_Data. Pdf, Apr. 10, 2016, pp. 133-166.

(Continued)

*Primary Examiner* — Aaron M Richer
(74) *Attorney, Agent, or Firm* — Fenwick & West LLP

(57) ABSTRACT

A process, and corresponding system for performing the process, is described herein for visual identification of label collision for a digital map. The process determines a set of labels to be rendered in a visual map corresponding to a digital map. For each label in the set, a label boundary is created around the label. If any of the label boundaries in the set of labels overlap, the process determines a display priority for each of the first label and the second label in an overlapping label pair. In response to the first label in the pair having a higher display priority than the second label in the pair, the boundary for the first label is rendered in a first visual style and the label boundary for the second label in a second visual style. As priorities or properties are changed, the visual map is updated to reflect the changes.

20 Claims, 10 Drawing Sheets

Related U.S. Application Data

(60) Provisional application No. 62/376,868, filed on Aug. 18, 2016.

(51) Int. Cl.

| | | |
|---|---|---|
| *G06F 16/29* | (2019.01) | |
| *G06F 3/0484* | (2013.01) | |
| *G06F 3/0482* | (2013.01) | |
| *G06F 16/28* | (2019.01) | |
| *G06F 16/23* | (2019.01) | |
| *G01C 21/36* | (2006.01) | |
| *G09B 29/00* | (2006.01) | |
| *G06F 3/0486* | (2013.01) | |

(52) U.S. Cl.
CPC ............ *G06T 11/206* (2013.01); *G06T 11/60* (2013.01); *G09B 29/003* (2013.01); *G06F 2203/04806* (2013.01); *G06T 2200/24* (2013.01)

(56) References Cited

U.S. PATENT DOCUMENTS

| | | |
|---|---|---|
| 9,111,380 B2 | 8/2015 | Piemonte et al. |
| 9,563,450 B1 | 2/2017 | Totale et al. |
| 10,444,940 B2 | 10/2019 | Cervelli et al. |
| 10,444,941 B2 | 10/2019 | Cervelli et al. |
| 2002/0091758 A1 | 7/2002 | Signh et al. |
| 2002/0175948 A1 | 11/2002 | Nielsen et al. |
| 2005/0231392 A1 | 10/2005 | Meehan et al. |
| 2008/0231643 A1 | 9/2008 | Fletcher |
| 2009/0015596 A1 | 1/2009 | Fuchs et al. |
| 2011/0214050 A1 | 9/2011 | Stambaugh |
| 2011/0289077 A1 | 11/2011 | Wade et al. |
| 2013/0124980 A1 | 5/2013 | Hudson et al. |
| 2013/0147794 A1 | 6/2013 | Lee et al. |
| 2013/0321450 A1 | 12/2013 | Hultquist et al. |
| 2013/0339891 A1 | 12/2013 | Blumenberg et al. |
| 2014/0340421 A1 | 11/2014 | Otero et al. |
| 2014/0354629 A1 | 12/2014 | Adlers et al. |
| 2014/0365935 A1 | 12/2014 | Moha et al. |
| 2015/0170385 A1 | 6/2015 | Appleton et al. |
| 2015/0186414 A1 | 7/2015 | Jones |
| 2015/0262399 A1 | 9/2015 | Popescu |
| 2015/0310652 A1 | 10/2015 | Dobson |
| 2016/0070451 A1 | 3/2016 | Kim et al. |
| 2016/0102983 A1 | 4/2016 | Javed et al. |
| 2017/0039765 A1 | 2/2017 | Zhou et al. |
| 2017/0052747 A1 | 2/2017 | Cervelli et al. |
| 2017/0228899 A1 | 8/2017 | Witriol et al. |
| 2017/0308549 A1 | 10/2017 | Sims et al. |
| 2019/0087442 A1 | 3/2019 | Zhang et al. |

OTHER PUBLICATIONS

Field, K. "Using scale visibility ranges for symbology in ArcGIS Online web maps," at https://www.esri.com/arcgis-blog/products/arcgis-online/mapping/using-scale-visibility-ranges-for-symbology-in-arcgis-online-web-maps, Dec. 12, 2011, pp. 1-7.

Scott, M. "ESRI WebGIS Highlights of What's New and the Road Ahead," West Virginia GIS Conference, at https://www.esri.com/arcgis-blog/products/arcgis-online/mapping/using-scale-visi bility-ranges-for-symbology-in-arcgis-onli ne-web-maps, May 5, 2016, pp. 1-68.

United States Office Action, U.S. Appl. No. 15/681,290, dated May 17, 2018, 14 pages.

United States Office Action, U.S. Appl. No. 15/681,286, dated Jan. 11, 2019, 24 pages.

United States Office Action, U.S. Appl. No. 15/681,290, dated Dec. 14, 2018, 14 pages.

United States Office Action, U.S. Appl. No. 15/681,284, dated Jan. 18, 2019, 56 pages.

United States Office Action, U.S. Appl. No. 15/681,288, dated Oct. 7, 2019, 16 pages.

United States Office Action, U.S. Appl. No. 15/681,286, dated Jul. 11, 2019, 28 pages.

United States Office Action, U.S. Appl. No. 15/681,286, dated Nov. 15, 2019, 31 pages.

United States Office Action, U.S. Appl. No. 16/530,707, dated Oct. 30, 2019, 135 pages.

Avenza Systems, "Using Map Themes to Automatically style CanVec+ Data on Import in MAPublisher," posted on Dec. 3, 2014, https://www.avenza.com/resources/blog/2014/12/03/using-map-themes-to-automatically-style-canvec-data-on-import-in-mapublisher/ (Year: 2014).

MacWright, T., "Introducing Mapbox Studio," Mapbox, Nov. 18, 2015, 11 pages.

Walton, A., "Designing the Blueprint style in Mapbox Studio," Nov. 5, 2015, https://blog.mapbox.com/designing-the-blueprint-style-in-mapbox-studio-2e41 e0c45141, 8 pages.

US 11,042,278 B2

PROVIDING GRAPHICAL INDICATION OF LABEL BOUNDARIES IN DIGITAL MAPS

RELATED APPLICATIONS

This application is a continuation of U.S. patent application Ser. No. 15/681,290, filed Aug. 18, 2017, which claims the benefit of U.S. provisional application 62/376,868, filed Aug. 18, 2016, the entire contents of which are hereby incorporated by reference as if fully set forth herein, under 35 U.S.C. § 119(e). This application also is related to non-provisional applications: Ser. No. 15/681,286, entitled "Providing Visual Selection of Map Data in a Digital Map," Ser. No. 15/681,288, entitled "Modifying Style Layer Properties of a Digital Map," and Ser. No. 15/681,284, entitled "Representation of Digital Map Styling Properties Across Zoom Levels," each of which were filed on Aug. 18, 2017, and the entire contents of each is hereby incorporated by reference as if fully set forth herein.

FIELD OF ART

The present invention generally relates to the field of graphical user interfaces and more specifically, to providing graphical indications of label boundaries in digital maps.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

While digital maps and graphical user interfaces for digital maps have entered wide use, creating such maps and interfaces is difficult using pre-existing software tools. Editing and authoring programs for creating digital map templates, colors, and features has been complex and required many manual operations. In particular, processes for customizing digital maps, or preparing digital maps in a manner that can adapt to other applications that use the maps, has been difficult or inconvenient. Therefore, there is a need for more flexible, comprehensive and convenient computer-based techniques for creating, modifying and manipulating digital maps and graphical user interfaces for digital computer display devices that display maps.

SUMMARY

As described herein, electronic map data is divided into a plurality of vector map tiles at a plurality of zoom levels, wherein each map tile corresponds to a portion of a geographic map. The map tiles are rendered when requested by a client, and each map tile is rendered based on one or more map styles, which defines the visual appearance of an electronic map, such as what map data to display in the electronic map, what order to render the data in, and how to style the data when it is rendered.

A map style comprises one or more map style layers, each of which may include a reference to a portion of electronic map data and one or more visual style rules to be applied to the portion of electronic map data. Map editing instructions are programmed or configured to cause display, in a graphical user interface of a computer display device and in association with a digital map, of one or more style layer properties of the digital map.

A process, and corresponding system for performing the process, is described herein for visual identification of label collision for a digital map. The process determines, for one or more label style layers corresponding to from a style sheet for a digital map, a set of labels to be rendered in a visual map corresponding to the digital map. For each label in the set of labels, a label boundary is created around the label. The process determines whether rendering the visual map will cause any of the label boundaries in the set of labels to overlap, and in response to overlap between a pair of labels, the process determines a display priority for each of the first label and the second label in the pair. In response to the first label in the pair having a higher display priority than the second label in the pair, upon rendering the visual map corresponding to the digital map, the process renders the label boundary for the first label in a first visual style and renders the label boundary for the second label in a second visual style. As priorities or properties are changed, the visual map is updated to reflect the changes.

DETAILED DESCRIPTION

Figure 1A:
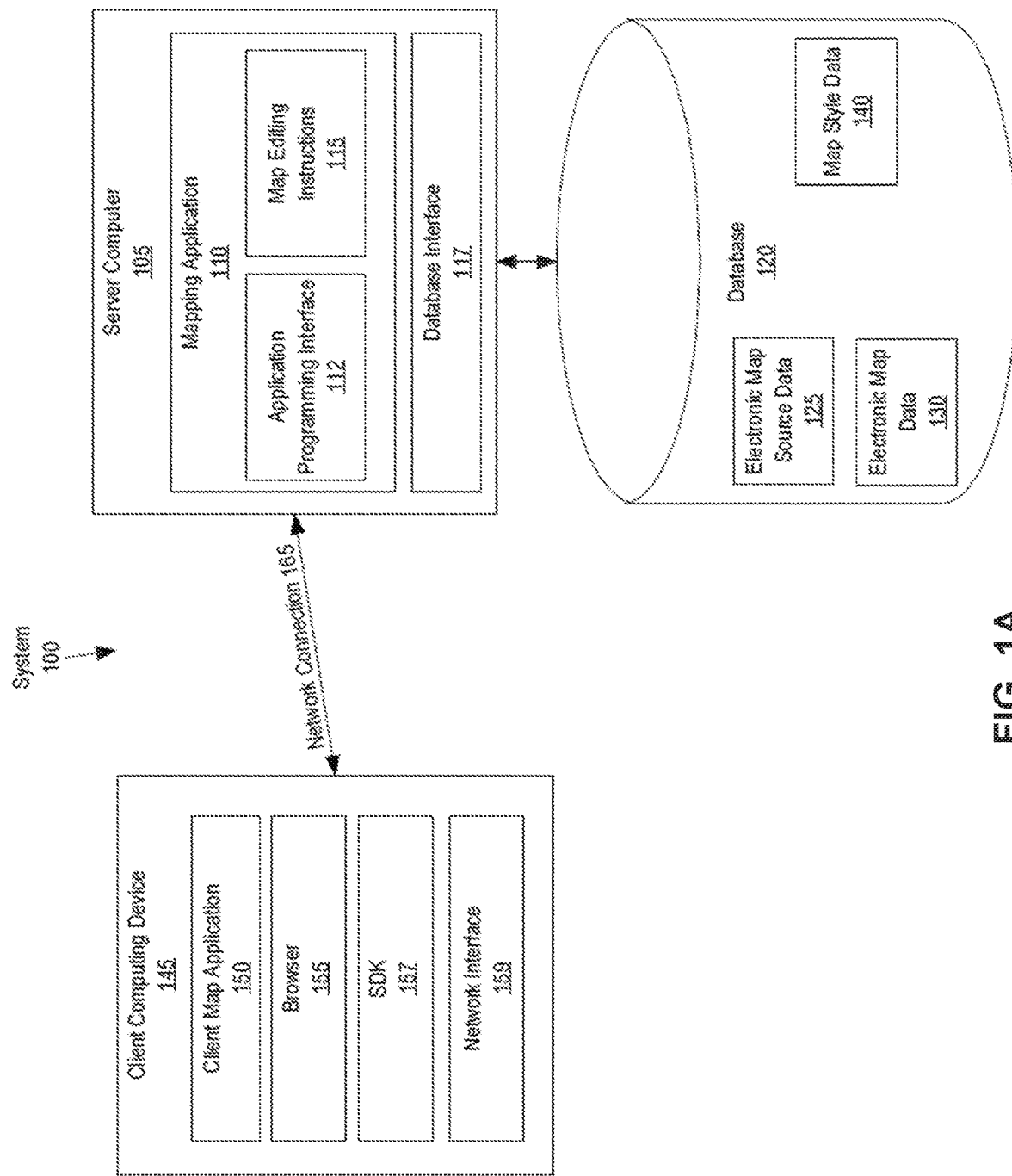
FIG. 1A illustrates an example computer system in which the techniques described herein may be practiced, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

System Overview

FIG. 1A illustrates an example computer system in which the techniques described may be practiced, according to one embodiment.

In an embodiment, a computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A illustrates a client computing device 145 that is coupled via a network connection 165 to a server computer 105, which is coupled to a database 120. The server computer comprises a mapping application 110, an application programming interface (API) 112, map editing instructions 115, and a database interface 117. The database 120 comprises electronic map source data 125, electronic map data 130, and map style data 140. The client computing device 145 comprises a client map application 150, browser 155, and wireless network interface 159.

In one embodiment, client computing device 145 is any computing device, such as a work station, personal computer, general purpose computer, laptop, hand-held computer, wearable computer, cellular or mobile phone, portable digital assistant (PDA), tablet computer, and the like. Although a single client computing device is depicted in FIG. 1A, any number of client computing devices may be present. Each client computing device 145 is communicatively connected to server computer 105 through network connection 165 which comprises any combination of a LAN, a WAN, one or more internetworks such as the public Internet, a cellular network, or a company network.

Client computing device 145 also includes network interface 159, which is used by the client computing device 145 to communicate with other devices. In particular, network interface 159 is used to establish network connection 165 to server computer 105. Network interface 159 may use Ethernet, WiFi, WiMAX, Bluetooth, ZigBee, cellular standards, or others.

Client computing device 145 also includes other hardware elements, such as one or more input devices, memory, processors, and the like, which are not depicted in FIG. 1A. Client computing device 145 also includes applications, software, and other executable instructions to facilitate various aspects of embodiments described herein. These applications, software, and other executable instructions may be installed by a user, owner, manufacturer, or other entity related to the client computing device.

In one embodiment, client computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods, or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In one embodiment, client computing device 145 includes browser 155. Browser 155 is a computer application that may request and execute instructions received from web servers to generate complex user interfaces that are presented to a user through one or more devices, such as a display or speakers. In response to input from a user, such as a mouse click indicating that the user selected an object defined in the instructions, such as a button or a text box, a browser may send a request based on the selected object to the web server. The request may be a request for data or include data to be processed by the web server. In an embodiment, browser 155 may receive instructions from server computer 105 to generate a user interface of a map editing program through which a user may create and modify map styles. Additionally or alternatively, client computing device 145 may include a map editing application or software that provides map editing functions as part of the application or software.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1A shows a single element, the server computer 105 broadly represents one or more multiple server computers, such as a server cluster, and the server computer 105 may be located in one or more physical locations. Server computer 105 may also represent one or more virtual computing instances that execute using one or more computers in a datacenter such as a virtual server farm.

Server computer 105 is communicatively connected to database 120 and client computer device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of customer software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1A, database 120 may span multiple devices located in one or more physical locations. For example, database 120 may include one or nodes located at a data warehouse(s). Additionally, in one embodiment, database 120 may be located on the same device(s) as server computer 105. Alternatively, database 120 may be located on a separate device(s) from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, map tile filter 135, and map style data 140. These datasets may be stored as columnar data in a relational database or as flat files.

In one embodiment, electronic map source data 125 is raw digital map data that is obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server computer. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector map tiles which may be subject to map style data to impose different display styles. Electronic map data 130 may be updated at any suitable interval, and may include additional information beyond that derived from electronic map source data 125.

In an embodiment, electronic map data is divided into a plurality of vector map tiles at a plurality of zoom levels, wherein each map tile corresponds to a portion of a geographic map. For example, a map tile may correspond to a square area of a geographic map at a particular zoom level, or an area of a pre-defined size and location within a geographic map. In an embodiment, the portion of electronic map data within each map tile may be organized in a compact, structured format, such as the Mapbox Vector Tile Specification format, by Mapbox, Inc., San Francisco, Calif. Additionally or alternatively, electronic map data 130 may comprise a plurality of map tile sets. A first set of map tiles may include electronic map data derived from a first set of electronic map source data, while a second set of map tiles may include electronic map data derived from a second set of electronic map source data.

In an embodiment, a map tile contains data describing map geometries, such as points, lines, and polygons, of features on the map. Additionally or alternatively, the map tile contains metadata, such as road names, place names, house numbers, feature types, and other properties. For example, electronic map data in a vector map tile corresponding to a portion of a geographic map may include geometry data representing roads, buildings, water, parks, and etc. to be depicted within the portion of the geographic map, as well as geometries for suggested placement of labels and other cartographic features. The map tile may also include metadata corresponding to each feature, such as names that can be rendered as labels on a digital map. Additionally or alternatively, the metadata includes data indicating the portion of the geographic map that the map tile corresponds to. For example, the metadata may include data indicating one or more coordinates of the map tile or one or more boundaries of the map tile. Additionally or alternatively, the metadata includes data indicating the zoom level at which that map tile is to be displayed.

In an embodiment, electronic map data is further organized into a plurality of data layers. Electronic map data may describe a plurality of map features, such as buildings, water, roads, etc. The map features may be grouped into the plurality of data layers. For example, a "Road" data layer may include map features such as streets, bridges, freeways, paths, and etc. As another example, a "Water" data layer may include map features such as rivers, lakes, oceans, canals, and etc.

In an embodiment, map tiles are used by program libraries and SDKs, such as SDK 157, as part of displaying maps on a mobile computing device or a browser. A map application or a browser may request one or more map tiles and process the map tiles to cause display of a visual map.

In an embodiment, map tiles are rendered when requested by a client, like a web browser or a mobile application. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API.

In an embodiment, a map tile is rendered based on a map style. Each map style of a plurality of map styles can be used to render the same map tile. In other words, the same portion of electronic map data may be displayed in a variety of visual styles. For example, in one map application, map tiles may be displayed with dark colors while in a second map application, map tiles may be displayed with light colors. Additionally or alternatively, the electronic map data required may differ based on map style. For example, in one map application, roads within a map tile may be displayed while buildings are not displayed. In another map application, landscape and rivers may be displayed while roads are not displayed.

In one embodiment, map style data 140 is digital data that defines one or more visual map styles for electronic maps. Map style data 140 may comprise a plurality of map styles. A map style defines the visual appearance of an electronic map, such as what map data to display in the electronic map, what order to render the data in, and how to style the data when it is rendered. In an embodiment, a map style may include information including, but not limited to, references to portions of electronic map data 130, map images, fonts, and rules specifying how the portions of electronic map data 130 should be styled when rendering a digital map, such as colors, line styles, line thickness, and etc.

In an embodiment, each map style may be stored as a document. For example, a map style may be stored as a JSON object that adheres to a particular style format specification. A map style may be generated using a map editing program or written independently and uploaded to a server computer.

In an embodiment, a map style comprises one or more map style layers. Each map style layer may include a reference to a portion of electronic map data and one or more visual style rules to be applied to the portion of electronic map data. In an embodiment, the reference to the portion of electronic map data specifies a particular map data source for the maps style layer. For example, the map style may specify a particular map tile set from a plurality of map tile sets as the map data source for the style layer. Additionally or alternatively, the map style layer may specify a particular data layer within the map tile set to associate with the style layer. For example, a style layer may specify visual style rules for a "Water" data layer of a set of map tiles.

In an embodiment, style layer data may include data indicating a style layer type for a map style layer. A map style layer may be a particular map style layer type, such as lines, polygons, symbols, circles, 3D polygons, and images. Additionally or alternatively, the style layer data may specify property values for one or more style layer properties associated with the style layer type. The style layer data may include data indicating property values to associate with each style layer property. In an embodiment, a property value may be a static value. Additionally or alternatively, the property value may be a dynamic value. For example, the property value may be a zoom level dependent value, such as a function that outputs a property value based on an input zoom level.

Each style layer type has a set of properties for which values may be specified. For example, a line style layer type may include style layer properties such as line width, line color, line style (solid, dotted, dashed), line cap style, line positioning, etc. As another example, a polygon style layer type may include style layer properties such as fill color, fill pattern, opacity, anti-aliasing, fill outline color, polygon positioning, etc.

In an embodiment, mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: receiving map tile requests from client computing devices, sending electronic map data to client computing devices, receiving map style data 140 from map editing applications, receiving electronic map source data 125 from data providers, processing electronic map source data 125 to generate electronic map data 130, and any other aspects of embodiments described herein. Mapping application 110 includes map editing instructions 115 which are programmed or configured to receive and store modified map style data. Additionally or alternatively, map editing instructions 115 may include instructions to perform the process as detailed in FIG. 8.

In one embodiment, map editing instructions 115 are programmed or configured to cause display, in a graphical user interface of a computer display device, a digital map and one or more label style layers of the digital map, wherein the digital map includes a plurality of overlapping labels and a plurality of non-overlapping labels. Map editing instructions 115 may be further programmed or configured to select a set of one or more overlapping labels to display in the digital map, display the set of one or more overlapping labels, and hide one or more overlapping labels that are not in the selected set. In an embodiment, map editing instructions 115 may be programmed or configured to receive a request to display label boundaries, and for each label in the plurality of overlapping labels and each label in the plurality of non-overlapping labels, display a graphical indication of label boundaries for the label.

In an embodiment, map editing instructions 115 may include instructions for causing display of a graphical user interface of a map editing program at client computing devices. Map editing instructions 115 may generate and send instructions to browser 155 to generate the graphical user interface. Additionally or alternatively, map editing instructions 115 may provide data to a map editing application or other software that provides map editing functions as part of the application or software. For example, map editing instructions may send map style data to a map editing application, receive new or updated map style data, and store received map style data to map style data 140.

Map editing instructions 115 may include, for example, JavaScript for various functions related to detecting whether labels will overlap in a rendered map. For example, a function for rendering a collision box.

A collision box represents an area of the map that that is covered by a label. A collision box represents a 3d volume. The first two dimensions, x and y, are specified with 'anchor' along with 'x1', 'y1', 'x2', 'y2'. The third dimension, zoom, is limited by 'maxScale' which determines how far in the z dimensions the box extends. As you zoom in on a map, all points on the map get further and further apart but labels stay roughly the same size. Labels cover less real world area on the map at higher zoom levels than they do at lower zoom levels. This is why areas are represented with an anchor point and offsets from that point instead of just using four absolute points. Line labels are represented by a set of these boxes spaced out along a line. When you zoom in, line labels cover less real world distance along the line than they used to. Collision boxes near the edges that used to cover label no longer do. If a box doesn't cover the label anymore it should be ignored when doing collision checks. 'maxScale' is how much you can scale the map before the label isn't within the box anymore.

For example, for a collision box function being centered around an anchor point:
function CollisionBox(anchor, x1, y1, x2, y2, maxScale) {
//the box is centered around the anchor point
this.anchor=anchor;
where the class is CollisionBox, and "anchor" is the anchor point the box is centered around. The parameter number "x1" is the distance from the anchor to the left edge, "y1" is the distance from the anchor to the top edge, "x2" is the distance from the anchor to the right edge, "y2" is the distance from the anchor to the bottom edge, and "maxScale" is the maximum scale this box can block other boxes at.

Another example is a function for a collision feature, which uses one or more collision boxes to represent all the area covered by a single label. It is used with a CollisionTile function to check if the label overlaps with any previous labels. A CollisionFeature is mostly just a set of CollisionBox objects.

For example, for a collision feature function:
function CollisionFeature (line, anchor, shaped, boxScale, padding, alignLine) {
var y1=shaped.top*boxScale−padding;
where the class is CollisionFeature. The parameter "line" is the geometry the label is placed on. The parameter "anchor" is the point along the line around which the label is anchored. The parameter "shaped" is the text or icon object shaping results. The parameter "boxScale" is a magic number used to convert from glyph metrics units to geometry units. The parameter "padding" is the amount of padding to add around the label edges. The parameter "alignLine" indicates whether the label is aligned with the line or the viewport.

A map editing program may be used to design a map to a user's specifications by allowing a user to select or upload map data, add custom fonts and images, or define and edit map styles, among other features. In an embodiment, a map editing program includes a map style editor creating custom map styles to a user's specifications. The map style editor may include a graphical user interface through which a user can define a custom map style or edit existing map styles.

Additionally or alternatively, the map style editor may include a visual map. The visual map may be displayed in conjunction with one or more map style layer properties. In an embodiment, the visual map is rendered based on the map style being edited in the map style editor. As changes are made to style layer properties, the visual map may be updated to reflect the changes. For example, if a user specifies a new width property value for roads, the map style editor may automatically re-display the visual map and render any roads shown within the map area using the new width property value.

According to one embodiment, the techniques described herein are implemented by one or more special-purpose computing devices. For example, the server computer 105 and client computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 1B:
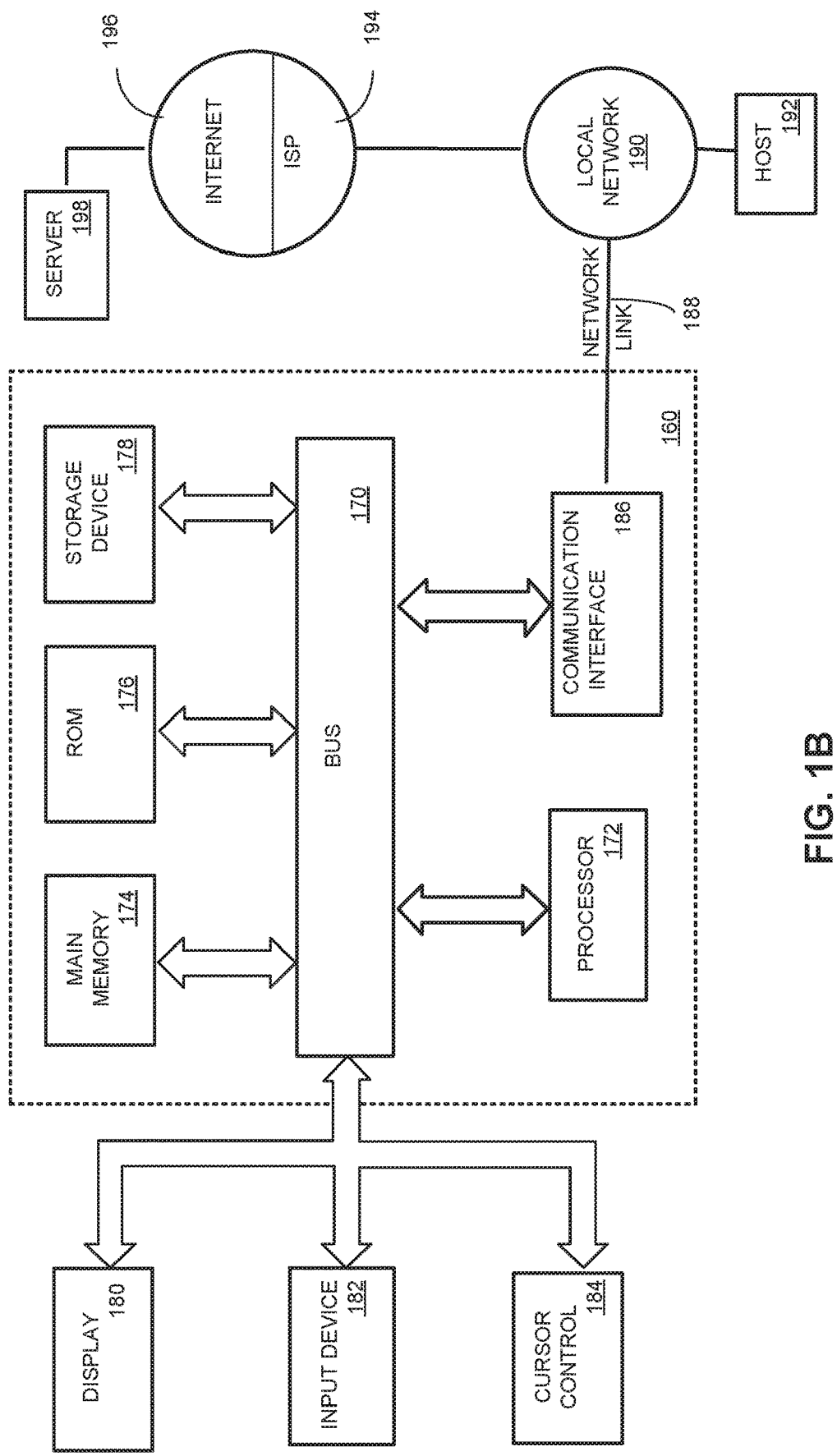
FIG. 1B illustrates a computer system upon which an embodiment may be implemented.

For example, FIG. 1B is a block diagram that illustrates a computer system 160 upon which an embodiment of the invention may be implemented. Computer system 160 includes a bus 170 or other communication mechanism for communicating information, and a hardware processor 172 coupled with bus 170 for processing information. Hardware processor 172 may be, for example, a general purpose microprocessor.

Computer system 160 also includes a main memory 174, such as a random access memory (RAM) or other dynamic storage device, coupled to bus 170 for storing information and instructions to be executed by processor 172. Main memory 174 also may be used for storing temporary variables or other intermediate information during execution of instructions to be executed by processor 172. Such instructions, when stored in non-transitory storage media accessible to processor 172, render computer system 160 into a special-purpose machine that is customized to perform the operations specified in the instructions.

Computer system 160 further includes a read only memory (ROM) 176 or other static storage device coupled to bus 170 for storing static information and instructions for processor 172. A storage device 178, such as a magnetic disk, optical disk, or solid-state drive is provided and coupled to bus 170 for storing information and instructions.

Computer system 160 may be coupled via bus 170 to a display 180, such as a cathode ray tube (CRT), LCD screen, LED screen, or touch screen, for displaying information to a computer user. An input device 182, which may include alphanumeric and other keys, buttons, a mouse, a touchscreen, or other input elements, is coupled to bus 170 for communicating information and command selections to processor 172. In some embodiments, the computer system 160 may also include a cursor control 184, such as a mouse, a trackball, or cursor direction keys for communicating direction information and command selections to processor 172 and for controlling cursor movement on display 180. The cursor control 184 typically has two degrees of freedom in two axes, a first axis (e.g., x) and a second axis (e.g., y), that allows the device to specify positions in a plane.

Computer system 160 may implement the techniques described herein using customized hard-wired logic, one or more ASICs or FPGAs, firmware and/or program logic which in combination with the computer system causes or programs computer system 160 to be a special-purpose machine. According to one embodiment, the techniques herein are performed by computer system 160 in response to processor 172 executing one or more sequences of one or more instructions contained in main memory 174. Such instructions may be read into main memory 174 from another storage medium, such as storage device 178. Execution of the sequences of instructions contained in main memory 174 causes processor 172 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 178. Volatile media includes dynamic memory, such as main memory 174. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 170. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 172 for execution. For example, the instructions may initially be carried on a magnetic disk or solid-state drive of a remote computer. The remote computer can load the instructions into its dynamic memory and send the instructions over a telephone line using a modem. A modem local to computer system 160 can receive the data on the telephone line and use an infra-red transmitter to convert the data to an infra-red signal. An infra-red detector can receive the data carried in the infra-red signal and appropriate circuitry can place the data on bus 170. Bus 170 carries the data to main memory 174, from which processor 172 retrieves and executes the instructions. The instructions received by main memory 174 may optionally be stored on storage device 178 either before or after execution by processor 172.

Computer system 160 also includes a communication interface 186 coupled to bus 170. Communication interface 186 provides a two-way data communication coupling to a network link 188 that is connected to a local network 190. For example, communication interface 186 may be an integrated services digital network (ISDN) card, cable modem, satellite modem, or a modem to provide a data communication connection to a corresponding type of telephone line. As another example, communication interface 186 may be a local area network (LAN) card to provide a data communication connection to a compatible LAN. Wireless links may also be implemented. In any such implementation, communication interface 186 sends and receives electrical, electromagnetic or optical signals that carry digital data streams representing various types of information.

Network link 188 typically provides data communication through one or more networks to other data devices. For example, network link 188 may provide a connection through local network 190 to a host computer 192 or to data equipment operated by an Internet Service Provider (ISP) 194. ISP 194 in turn provides data communication services through the world wide packet data communication network now commonly referred to as the "Internet" 196. Local network 190 and Internet 196 both use electrical, electromagnetic or optical signals that carry digital data streams. The signals through the various networks and the signals on network link 188 and through communication interface 186, which carry the digital data to and from computer system 160, are example forms of transmission media.

Computer system 160 can send messages and receive data, including program code, through the network(s), network link 188 and communication interface 186. In the Internet example, a server 198 might transmit a requested code for an application program through Internet 196, ISP 194, local network 190 and communication interface 186.

The received code may be executed by processor 172 as it is received, and/or stored in storage device 178, or other non-volatile storage for later execution.

User Interfaces and Process Flow

Figure 2:
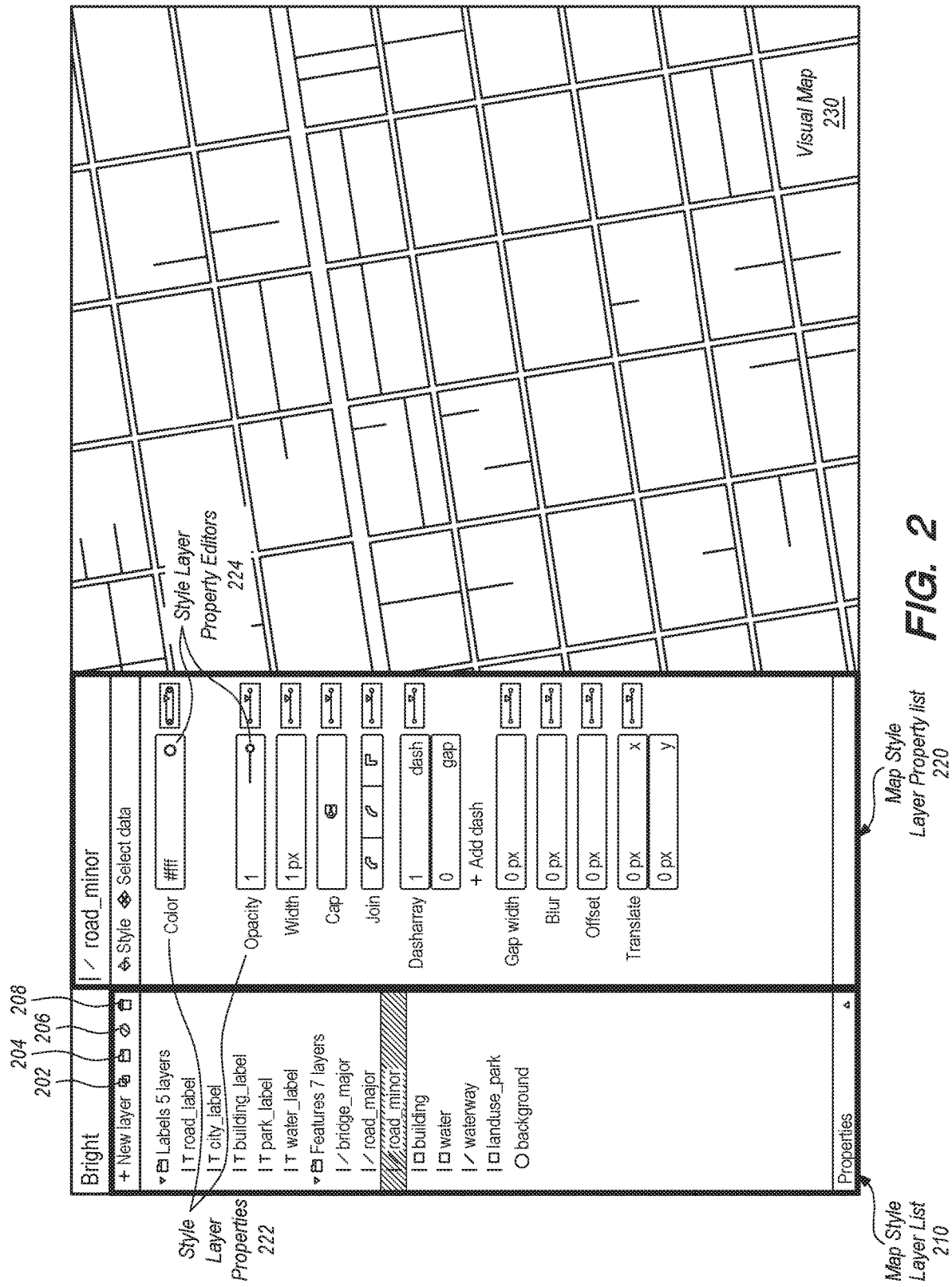
FIG. 2 illustrates a map style editor according to an embodiment.

FIG. 2 illustrates an example graphical user interface of a map style editor. The map style editor includes style layer list 210, style layer property list 220, and visual map 230.

In an embodiment, style layer list 210 displays a list of style layers and style layer groups for the selected map style. Additionally or alternatively, the style layer list 210 indicates the number of layers within each layer group next to the name of the layer group. In the illustrated example, map style layer list 210 lists a plurality of style layers and style layer groups for a map style titled "Bright."

Additionally or alternatively, a user can create, sort, group, and delete layers using the map style editor. In the illustrated example, style layer list 210 includes a toolbar comprising a new layer button, a duplicate layer button 202, a group/ungroup layers button 204, a show/hide layers button 206, and a delete layer button 208. The new layer button causes the map style editor to display a dialog for specifying map data styled by the map style layer, such as a source map tile set, style layer filters, and other information for creating a new map style layer. The duplicate layer button 202 allows a user to copy a style layer or a group of style layers. The group/ungroup layers button 204 groups multiple selected layers or ungroups a group of style layers. The show/hide layers button 206 shows or hides one or more selected style layers on the map. The delete layer button 208 deletes one or more selected style layers from the map style.

In an embodiment, selecting one or more style layers in the style layer list 210 allows a user to view and edit the properties for the selected layer(s). In the illustrated example, the "road_minor" style layer is selected in style layer list 210. Style layer property list 220 displays style layer properties that are associated with a selected style layer. Additionally or alternatively, style layer property list 220 displays the property value assigned to each style layer property. In the present example, style layer property list 220 includes a plurality of style layer properties for the "road_minor" style layer, such as the ones indicated by the label style layer properties 222.

In an embodiment, style layer property list 220 includes a property editor for one or more style layer properties, such as the style layer property editors 224 indicated for style layer properties 222. In the example illustrated in FIG. 2, the Color, Width, and Opacity style layer properties each have a corresponding text field. The text fields indicate the current value of each style layer property. A user may select a value for the property or edit an existing value for the property using the property editor. For example, selecting a property editor may bring up a graphical editor where the user can select a value for the property, such as a color selection panel for the Color property. A user may also edit the property value by typing or pasting text into the text field, or adjust a numerical value using arrow keys. Other properties may have buttons or other types of user interface components that allow a user to select or specify a property value.

In an embodiment, selecting a property editor may cause the map style editor to display a graphical editor where the user can select an existing property value. An existing property value may include other values assigned to the same style property in other style layers. For example, if a line color property is selected, the map style editor may display a list of line colors used in other style layers. Existing values may also include values for other properties that have a similar value type. For example, selecting a style property with a color property value may cause the map style editor to display a list of all colors used in other style layers of the map, such as other line colors, fill colors, text color, and etc. Selecting an existing style property value sets the value of the selected style property.

In an embodiment, if a layer group is selected, editing a style layer property sets the property value for every style layer within the style layer group. If style layers within a style layer group have different values for the same style layer property, the map style editor may display a list of the different property values and let the user select a property value to apply to the style layer property for all style layers in the style layer group. In an embodiment, only style layers of the same style layer type—symbols, circles, fills, lines, backgrounds, or polygons—can be edited together. If a selection includes more than one style layer type, the map style editor may offer a selection of style layer types for a user to select and narrow down to a single type.

Visual map 230 is a visual representation of a particular area of a digital map. In an embodiment, one or more map tiles corresponding to the particular area of the digital map are requested and processed in order to render the visual map. Visual map 230 may be updated or re-redisplayed as a user pans or zooms the map. Additionally or alternatively, visual map 230 may be rendered based on the selected map style that is being edited in the map style editor. When changes are made to the map style, the map style editor may update or re-display visual map 230. In other words, visual map 230 may provide a real-time representation of how digital maps will look if rendered using the selected map style.

Map Labels

A digital map may include a plurality of map labels. A map label may include text, one or more icons, or a combination thereof. In an embodiment, a label style layer specifies a map data source for the label style layer. Additionally or alternatively, the label style layer specifies property values for one or more label style layer properties.

In an embodiment, electronic map data includes metadata such as road names, place names, house numbers, feature types, and other properties. A label style layer may specify what metadata, from a map data source, to use as label text when displaying map labels. For example, a style layer may specify that the "name" property associated with map features of a source map data layer should be used when displaying labels for the corresponding map features. Additionally or alternatively, the style layer may specify an image, from a plurality of available icons and images, to display as a label icon in map labels.

In an embodiment, a label style layer specifies property values for one or more label style layer properties. Label style layer properties may indicate how label text or label icons associated with the style layer should be rendered. Example label style layer properties include map label properties such as label font, font size, label color, letter spacing, letter case, and etc. for label text, and icon size and opacity for label icons.

Map labels may include point labels and line labels. A point label corresponds to a particular point on a digital map, such as a building, and is rendered on or around the point. A line label corresponds to a line in a digital map, such as a road. A map renderer determines where on a line, displayed in the visual map, that the corresponding line label should be rendered. In an embodiment, the type of map label is based on the geometry type of the associated map features. For example, a line geometry type may correspond to a line label, while a point or polygon geometry type may correspond to a point label. Additionally or alternatively, a label style layer may include data indicating a label type for labels associated with the label style layer.

Label Collision Detection

If two or more labels are rendered close together on a digital map, portions of the labels may overlap. A map renderer may perform collision detection while rendering labels in order to reduce or eliminate label overlap. The map renderer may determine whether two labels will overlap if both labels are rendered. In an embodiment, if the map renderer determines that the labels will overlap, the renderer selects a particular label from the two labels to render. The remaining label is not rendered in the visual map. The visual map described herein is for use in conjunction with the map editor function, and serves as a preview of the to-be-displayed final or "digital" map. Thus, labels rendered in the visual map in the first visual style would be displayed in a displayed final map corresponding to the visual map, whereas the second visual style indicates that the second label would not be displayed in the displayed final map corresponding to the visual map.

Figure 3:
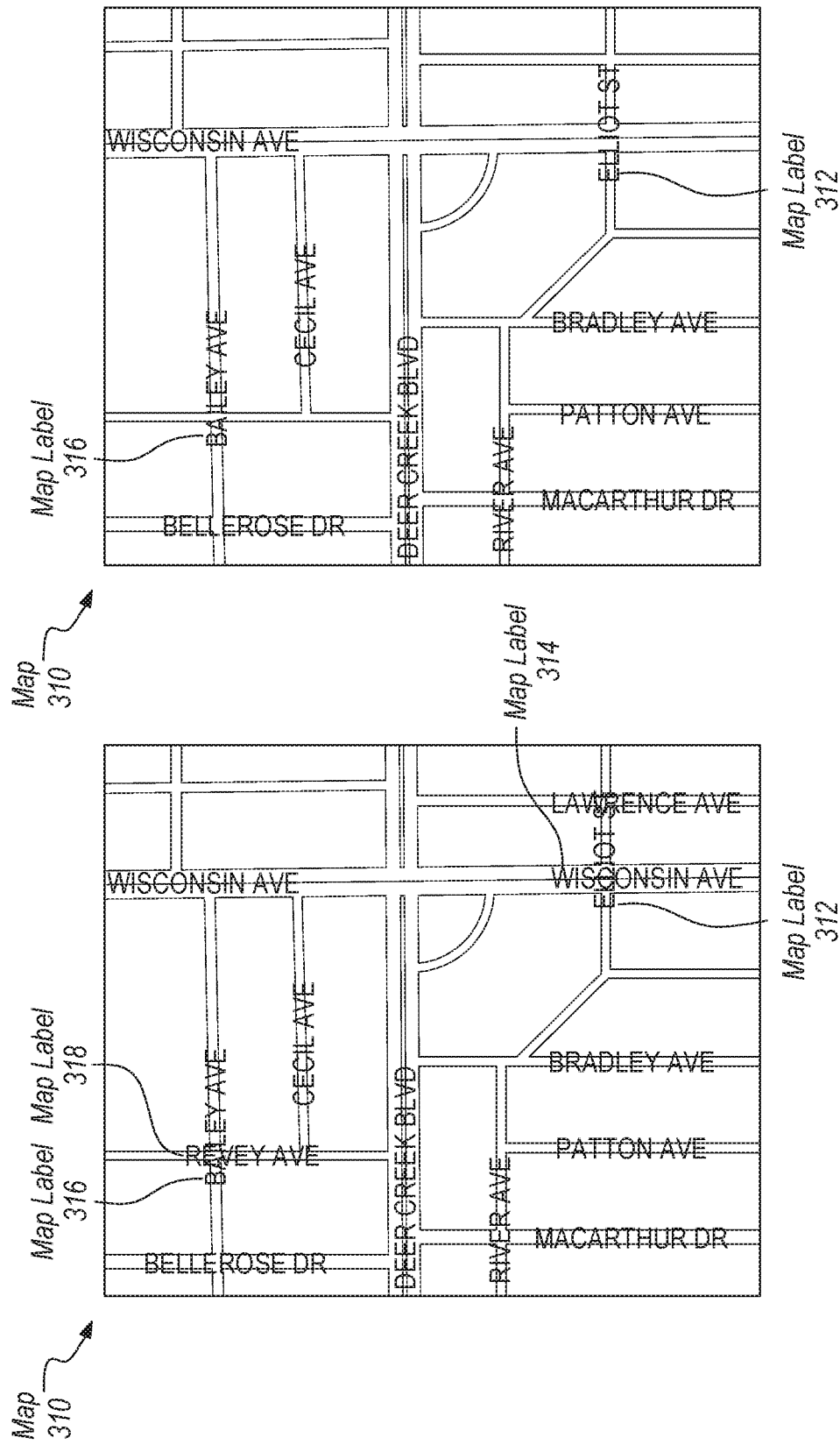
FIG. 3A illustrates an example digital map without label collision detection, according to an embodiment.
FIG. 3B illustrates an example digital map with label collision detection, according to an embodiment.

FIG. 3A illustrates an example digital map without collision detection. Map 310 is rendered without label collision detection. Map 310 includes a plurality of labels that overlap. For example, map label 312 overlaps map label 314, and map label 318 overlaps map label 316.

FIG. 3B illustrates map 310 after collision detection. A map renderer determines that the street labels overlap, and selects a label from each set of overlapping labels to render. In the illustrated example, label 312 and label 316 are rendered in the visual map, while labels 314 and 318 are not rendered in the visual map, and thus not displayed in the final displayed digital map 310.

In an embodiment, to perform collision detection, a label boundary is created around each label. Additionally or alternatively, the label boundary comprises a plurality of bounding boxes that correspond to each symbol, character, or icon of the label. As labels are rendered, the label boundary for each label is checked against the label boundaries for other labels. If two label boundaries collide, then the labels overlap.

In an embodiment, if the map renderer determines that two labels overlap, the renderer selects which label to render and which labels to not render based on a priority associated with each label. For example, a map style specifies a plurality of style layers, including two or more label style layers. The order in which map labels from each style layer are rendered may be based on the order in which the label style layers are specified in the map style. Map labels associated with style layers higher in the layer list may be rendered first. The layer boundary for a subsequent label may be compared against layer boundaries for previously rendered labels. If the label boundary collides with label boundaries of previously rendered labels, then the subsequent label may not be rendered. Additionally or alternatively, within a data layer, map labels may rendered in the order in which they are defined.

In an embodiment, label collision detection only occurs for map labels within a single map tile set. The map renderer may perform label collision calculations once per source map tile set. The renderer then combines all the map data sources together to generate the digital map. As an example, assume a map includes country labels and airport labels. Data for the country labels is from a first map vector tile, while data for airport labels is from a second map vector tile. Collision detection may be performed for map labels within the same map vector tile, while placement of map labels from the two different map vector tiles is performed separately. For example, the map renderer may determine whether an airport label overlaps with other airport labels, but not whether an airport label overlaps with a country label. Thus, in this example, airport labels may not overlap with each other, but when the tile is rendered, country labels may overlap with airport labels.

Additionally or alternatively, a map renderer may be configured to perform label collision detection for map labels across a plurality of source map tile sets by compositing the sources. By compositing, two or more map tile sets are combined to form a single, composited map tile set. Label placement is performed for the composited map tile set. When label placement is calculated, collisions between labels across different map tile sets may be detected. In an embodiment, a map renderer may be configured to automatically perform label collision detection using composited sources. Additionally or alternatively, a map renderer may request map tiles for a portion of a digital map and receive composited map tiles in response to the request.

Collision detection can be disabled for map labels of a particular style layer based on style layer properties. Label overlap properties, such as "allow overlap" or "ignore placement" properties, may allow map labels from the style layer to be rendeed even if overlap occurs. An "allow overlap" property, if assigned a value of "true," allows map labels from the style layer to be rendered even if they overlaps other, previously rendered labels. An "ignore placement" property, if assigned a value of "true," allows subsequent labels to be rendered even if it overlaps with map labels from the style layer.

A digital map may be displayed at a plurality of different combinations of zoom, bearing, and pitch. In an embodiment, changing the zoom, bearing, or pitch at which a digital map is displayed causes the digital map to be re-displayed. The map renderer may recalculate the location and placement of one or more map labels in the digital map. In response to re-calculating the location and placement of labels, the set of overlapping labels and the set of non-overlapping labels may also change. An updated set of one or more overlapping labels is selected to be displayed in accordance with the properties of the style layers of the map. Overlapping labels that are not in the updated set are hidden.

Graphical Indication of Label Boundaries

In an embodiment, the map style editor may indicate, in the visual map, bounding boxes of labels in the map and any label collisions between labels in the map. The map style editor may display a graphical indication of one or more label boundaries corresponding to labels within the digital map. Using the graphical indication, users can determine which labels in the digital map are rendered and which labels were available in the digital map but are not rendered.

In an embodiment, the map style editor receives a request to display label boundaries. In response to receiving the request, the map style editor displays in the visual map a graphical indication of label boundaries for each label available in the digital map. The graphical indication of label boundaries may include labels that are rendered in the digital map as well as labels that are not rendered in the digital map.

In an embodiment, the visual map provides a real-time representation of how the digital map will look if rendered using the current map style. Non-overlapping labels are rendered in the visual map. One or more overlapping labels are selected to be rendered in the visual map in accordance with the properties of the style layers of the map, while the remaining overlapping labels are not rendered in the visual map, or rendered in a way that is visually distinguished to indicate that they would not be displayed in the final digital map. In this embodiment, the map style editor displays in the visual map graphical indications of label boundaries for labels that will be rendered in the digital map as well as labels that will not be rendered in the digital map.

Additionally or alternatively, each map label may be associated with a plurality of bounding boxes. The graphical indication of label boundaries for a map label may indicate each bounding box of the plurality of bounding boxes.

In an embodiment, the map style editor displays the graphical indication of label boundaries for visible map labels in a first visual style. The graphical indication of label boundaries for hidden map labels is displayed in a second visual style. For example, the label boundaries for labels in that are displayed in the digital map may be rendered in the visual map using solid lines, while the label boundaries for labels that are hidden in the digital map are rendered in the visual map using dotted lines. Additionally or alternatively, the label boundaries for labels that are rendered in the visual map may be displayed using a first color, while the label boundaries for labels that are not rendered in the visual map are displayed using a second color. For example, label boundaries for labels that are displayed in the digital map may be displayed in green in the visual map, while label boundaries for labels that are hidden in the digital map may be displayed in red in the visual map. Additionally or alternatively, the graphical indication of label boundaries for a map label may be rendered in the visual map using a visual style associated with a label style layer of the map label. For example, label boundaries for a non-rendered street label may be displayed in yellow with dotted lines, label boundaries for a rendered street label may be displayed in yellow with solid lines, and label boundaries for a non-rendered place label may be displayed in purple with dotted lines.

Figure 4:
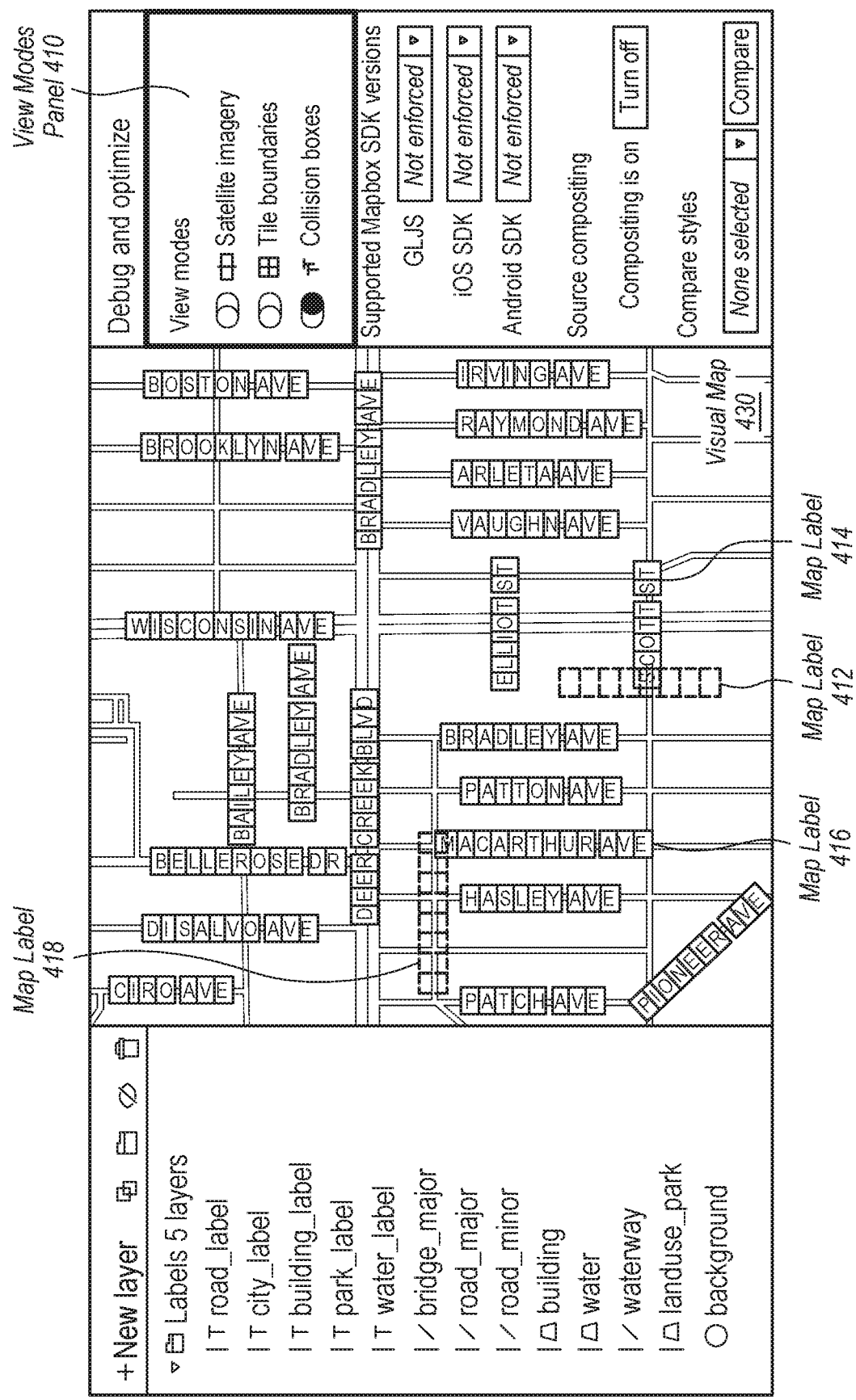
FIG. 4 illustrates an example graphical indication of label boundaries, according to an embodiment.

FIG. 4 illustrates an example map style editor with label boundaries rendered in the visual map. The map style editor includes a view modes panel 410 and a visual map 430. View modes panel 410 comprises a plurality of editor view options. In the illustrated example, the editor view options includes "satellite imagery," "tile boundaries," and "collision boxes." Enabling or selecting the "collision boxes" option sends a request to show the label boundaries in visual map 430.

Visual map 430 includes a plurality of overlapping labels and a plurality of non-overlapping labels. A set of one or more overlapping labels are rendered in the visual map, in accordance with the properties of the style layers of the map, while one or more overlapping labels not in this set are not rendered in the visual map, or rendered so as to be visually distinguished form the rendered set. For example, map label 414 and map label 412 overlap. Map label 414 is rendered in visual map 430 while map label 412 is not rendered in visual map 430. As another example, map label 418 overlaps map label 416. Map label 416 is rendered in visual map 430, and map label 418 is not rendered in visual map 430.

A graphical indication of label boundaries is displayed for each label of the plurality of non-overlapping labels and for each label of the plurality of overlapping labels. In the example illustrated in FIG. 4, the graphical indication of label boundaries for labels that are displayed in the digital map is rendered in visual map 430 with a solid line. The graphical indication of label boundaries for labels that are not shown in the digital map is rendered in visual map 430 with a dotted line. Additionally, each label boundary comprises a plurality of bounding boxes corresponding to characters in the label text.

Additionally or alternatively, the graphical indication of label boundaries for labels that are displayed in the digital map may be rendered in the visual map using a different color than the graphical indication of label boundaries for labels that are not shown in the digital map. For example, the graphical indication of label boundaries for visible labels may be displayed in green, while the graphical indication of label boundaries for labels not shown may be displayed in red in the visual map.

Based on the graphical indication of label boundaries, a user can modify one or more label style layer properties to modify which map labels are ultimately displayed in the digital map. In an embodiment, label style layer properties include label text properties, label icon properties, and label placement properties.

Label text properties affect the appearance of text displayed in map labels associated with the map style layer. Example label text properties include label font, font size, letter spacing, line height, text capitalization, text halo, and text positioning, such as rotation, justification, and anchor point.

Label icon properties affect the appearance of icons displayed in map labels associated with the map style layer. Example label icon properties include icon image, icon size, and icon positioning, such as offset, translation, and rotation.

Modifying a label text property or a label icon property may modify the location at which associated map labels are rendered in the digital map. Additionally or alternatively, using the graphical interface of the visual map, a user may specify input modifying the position of a particular label, changing where it is rendered in the digital map. For example, a user may drag and drop a particular label to re-position the label within the currently displayed visual map. The map style editor may associate the particular label with the updated position and set the updated position as the location at which the particular label is rendered in the digital map.

Label placement properties affect the positioning of map labels associated with the map style layer. Example label placement properties include label type (point or line), label spacing, padding, "allow overlap," and "ignore placement." Modifying a label overlap property such as "allow overlap" or "ignore placement" may enable or disable collision detection for associated map labels.

In an embodiment, in response to receiving an updated property value, the map style editor re-displays the visual map of the digital map based on the updated property value. Re-displaying the visual map may include re-calculating the location and placement of one or more labels in the digital map and re-rendering the one or more labels with collision detection. In an embodiment, the map style editor determines an updated plurality of overlapping labels and an updated plurality of non-overlapping label, based on the updated property value. A label that previously overlapped another label may no longer overlap the other label. The label is removed from the plurality of overlapping labels and added to the plurality of non-overlapping labels. Additionally or alternatively, a label that previously did not overlap any other labels may now overlap another label. The label is removed from the plurality of non-overlapping labels and added to the plurality of overlapping labels.

In an embodiment, map labels from the updated plurality of non-overlapping labels are rendered in the visual map. An updated set of one or more overlapping labels are selected to be rendered in the visual map in accordance with the properties of the style layers of the map. Overlapping labels that are not in the updated set are not rendered in the visual map. In an embodiment, the graphical indication of label boundaries is updated to indicate the updated set of overlapping labels.

For the purpose of illustrating a clear example, assume a map label overlapped other map labels and would be hidden in the digital map. In response to updating a label style layer property, the map label no longer overlaps a label and would be displayed in the digital map. The graphical indication of label boundaries for the map label is updated in the visual map to indicate that the map label would be displayed in the digital map.

Figure 5:
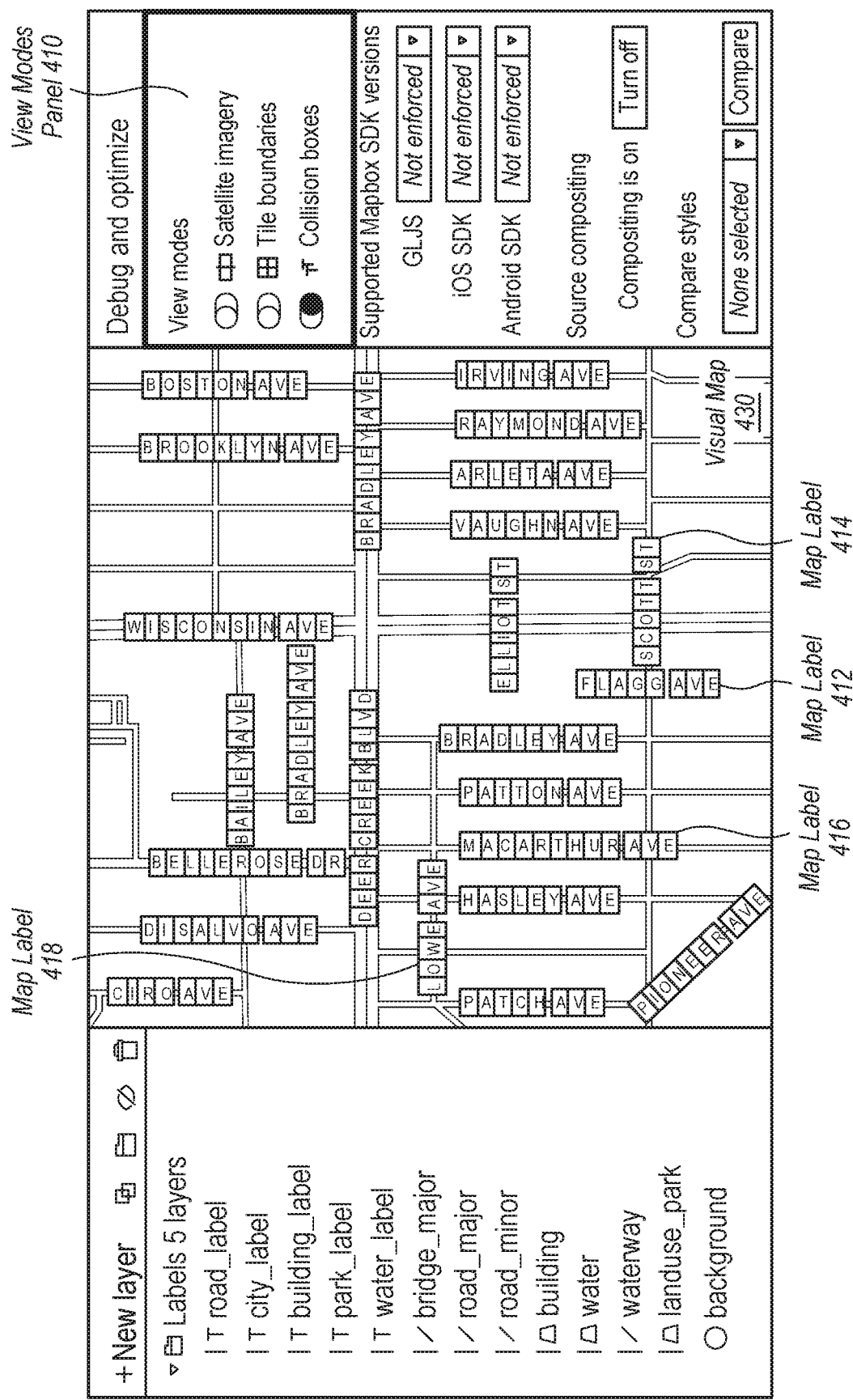
FIG. 5 illustrates an example graphical indication of label boundaries after modifying a label size property, according to an embodiment.

FIG. 5 illustrates an example map style editor after a label text property has been modified. For the purpose of illustrating a clear example, assume the font size for road labels in visual map 430 was decreased. Visual map 430 is re-displayed using the smaller font size to display road labels. Additionally, the graphical indication of label boundaries for each label is updated to indicate the smaller bounding boxes around each label text character.

For example, referring FIG. 4, map label 414 and 412 overlapped one another. Label 414 was rendered, while label 412 was not rendered. In the updated visual map 430, map labels 414 and 412 are displayed in a smaller size and do not overlap. Both map label 414 and map label 412 are visible in visual map 430. The graphical indication of label boundaries for map label 412 is updated and displayed using a solid line in the visual map to indicate that map label 412 is would be displayed in the digital map.

Figure 6:
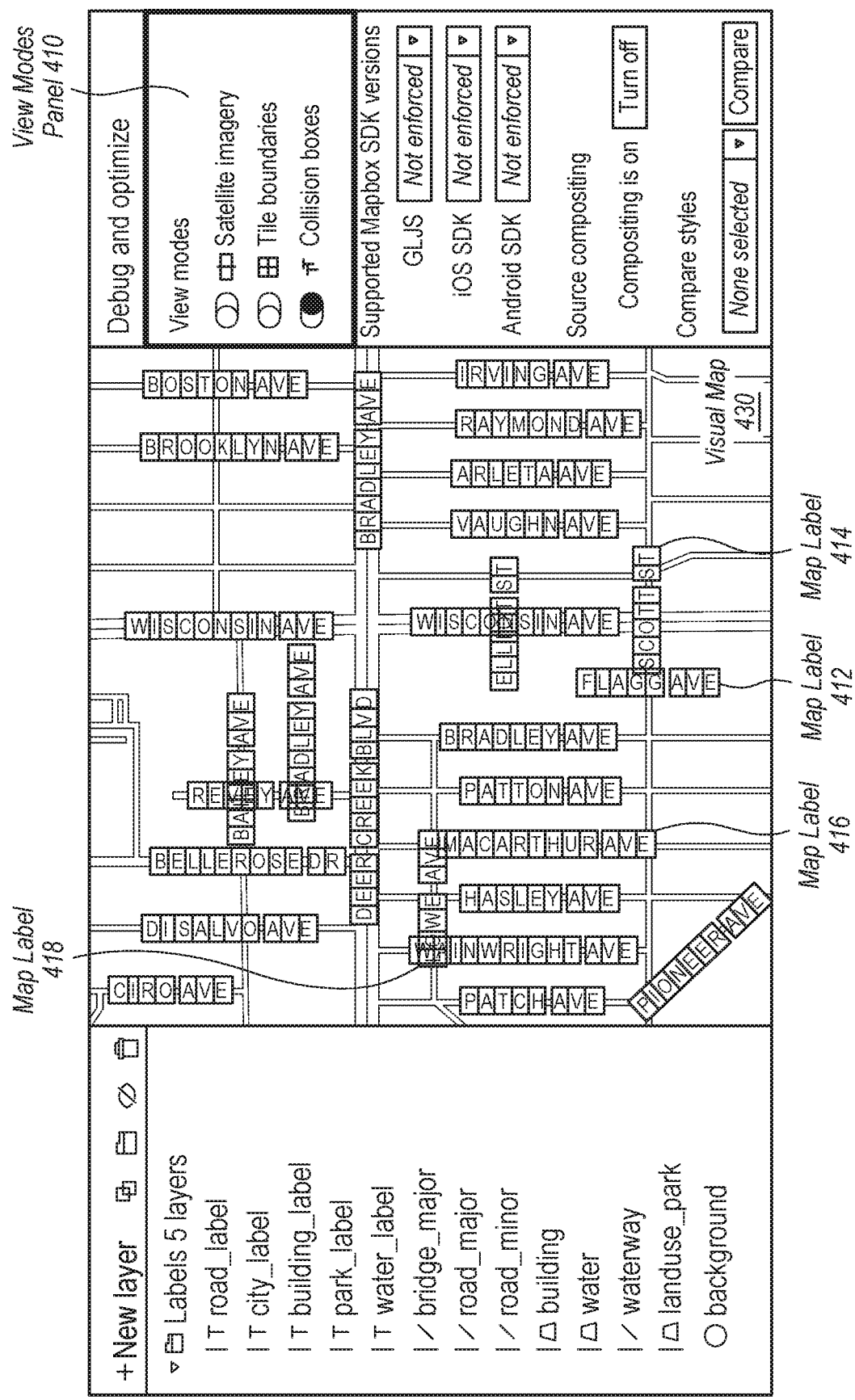
FIG. 6 illustrates an example graphical indication of label boundaries after modifying a label overlap property, according to an embodiment.

FIG. 6 illustrates an example map style layer editor after a label overlap property has been modified. For the purpose of illustrating a clear example, assume an "allow overlap" property for road labels of the "road_label" map style layer has been set to "true." When set to "true," the "allow overlap" property allows map labels associated with the map style layer to be displayed in the digital map even if they overlap with previously rendered labels.

Visual map 430 is re-displayed using the updated label overlap property. In the illustrated example, map labels 414 and 412 overlap, but both map labels are rendered in updated visual map 430. Similarly, map labels 416 and 418 overlap, but both map labels 416 and 418 are rendered in visual map 430. In addition, the graphical indication of label boundaries for each of map labels 412 and 418 is updated and displayed using a solid line in the visual map to indicate that the map labels would be displayed in the digital map.

In an embodiment, in response to receiving an updated priority associated with a label style layer, the map style editor re-displays the visual map based on the updated priority. Re-displaying the visual map may include re-calculating the location and placement of one or more labels in the visual map and re-rendering the one or more labels with collision detection. In an embodiment, the map style editor determines an updated plurality of overlapping labels and an updated plurality of non-overlapping label, based on the updated style layer priority. As a result of the updated priority, a first map label that was rendered after a second map label may be rendered before the second label in the updated visual map. Assume the first map label was hidden because it overlapped the second label. In the updated visual map, the second label may be hidden while the first label is displayed, because the first label is rendered first.

Figure 7A:
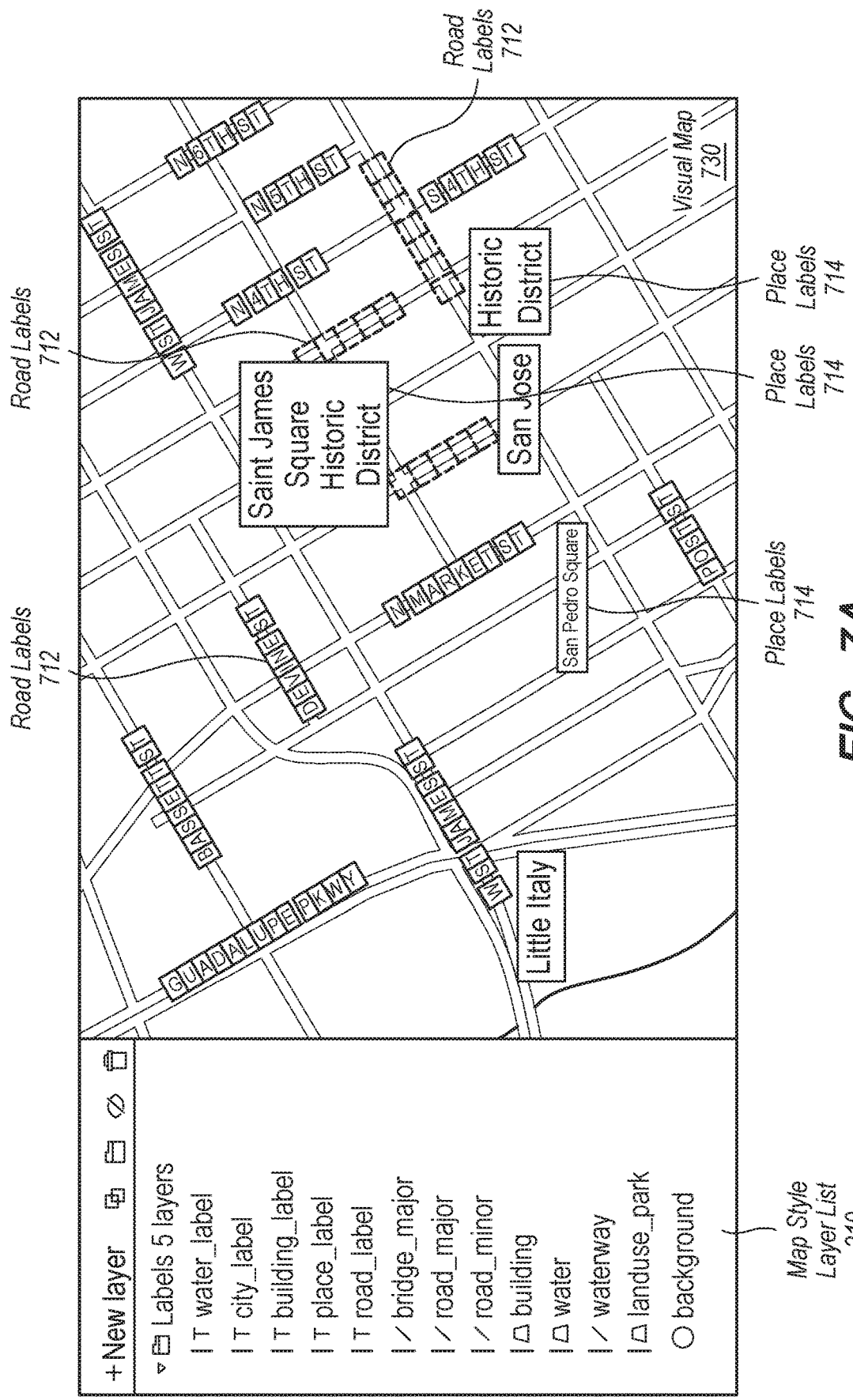
FIG. 7A-7B illustrates an example graphical indication of label boundaries before and after modifying a label style layer priority, according to an embodiment.

FIG. 7A illustrates an example visual map of a map style editor. Visual map 730 comprises a plurality of road labels, such as road labels 712, and a plurality of place labels, such as place labels 714. Style layer list 210 lists the "place_label_other" style layer before the "road_label" style layer. As illustrated in FIG. 7A, when a road label overlaps with a place label, the place label is rendered and the road label is not rendered.

Figure 7B:
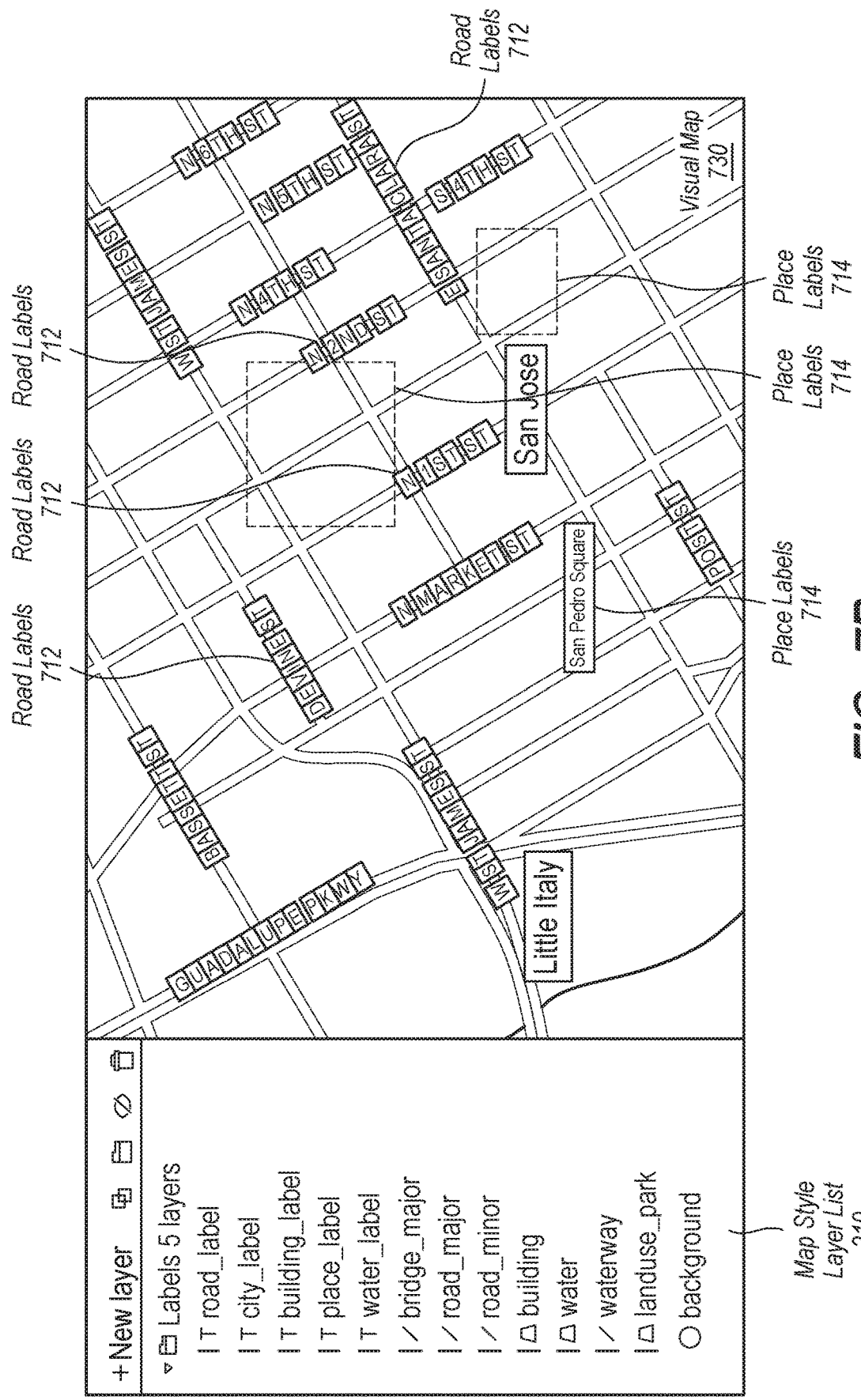

FIG. 7B illustrates an example map style editor after receiving an updated priority for a style layer. Assume the map style editor receives user input specifying that the "road_label" style layer has a higher priority than the "place_label_other" style layer. Updated style layer list 710 lists the "road_label" style layer before the "place_label_other" style layer. The map style editor re-displays visual map 730 based on the updated priority for the "road_label" style layer. As illustrated in FIG. 7B, when a road label overlaps with a place label, the road label is rendered and the place label is not rendered in the updated visual map 730. The graphical indication of label boundaries for each map label is updated to indicate whether the label would be displayed in the digital map.

Figure 8:
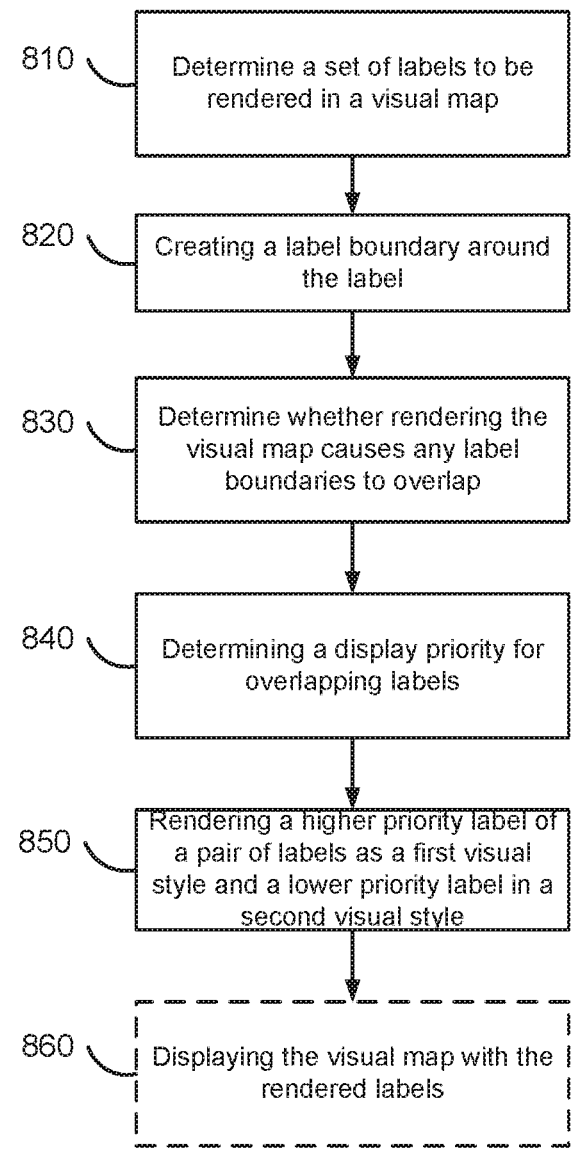
FIG. 8 illustrates a flowchart of a process for visual identification of label collision for a digital map, according to an embodiment.

FIG. 8 shows a process 800 for representing style layer properties at various zoom levels, according to one embodiment. In various embodiments, the operations of the process 800 of FIG. 8 may be implemented in programming by a server computer 105 or its components as described herein.

For example, the operations of process 800 may be performed by the mapping application 110 according to map editing instructions 115 as described with reference to FIGS. 1-7. In some examples, the server computer 105 may execute a set of instructions or sequence of instructions (e.g., the map editing instructions 115) to control the functional elements of server computer 105 to perform the functions described below. Additionally or alternatively, server computer 105 may perform aspects of the functions described below using special-purpose hardware. In some embodiments, the map editing instructions 115 may instruct the server computer to interact with the database 120 to perform the functions described below using database interface 117. In some embodiments, one or more functions described below may be performed by the mobile computing device 145.

Initially, the server computer 105 executing the mapping application 110 determines 810, for one or more label style layers corresponding to from a style sheet for a digital map, a set of labels to be rendered in a visual map corresponding to the digital map. For each label in the set of labels, the server computer 105 executing the mapping application 110 creates 820 a label boundary around the label.

The server computer 105 executing the mapping application 110 then determines 830 whether rendering the visual map will cause any of the label boundaries in the set of labels to overlap. In response to a first label boundary for a first label in the set of labels overlapping with a second label boundary for a second label in the set of labels, the server computer 105 executing the mapping application 110 determines 840 a display priority for each of the first label and the second label. Likewise, this process repeats for any pair of overlapping labels to determine display priority, first looking at priority of the layers, then at priority within each layer. In one embodiment, server computer 105 executing the mapping application 110 receives a request to display the label boundaries, and for each label in the set of labels, displays a graphical bounding box in the visual map that shows label boundaries for the label.

In response to the first label in a pair having a higher display priority than the second label, upon rendering the visual map corresponding to the digital map, the server computer 105 executing the mapping application 110 renders 850 the label boundary for the first label in a first visual style and renders the label boundary for the second label in a second visual style. In one embodiment, the first visual style indicates that the first label would be displayed in a displayed final map corresponding to the visual map, and the second visual style indicates that the second label would not be displayed in the displayed final map corresponding to the visual map. In one embodiment, displaying the graphical indication using the first visual style includes using a first color and displaying the graphical indication using the second visual style includes using a second color that is different from the first color. In another embodiment, displaying the graphical indication using the first visual style includes using a solid line outline and wherein displaying the graphical indication using the second visual style includes using a dotted line outline.

The server computer 105 executing the mapping application 110 then displays the 860 visual map with the rendered labels.

Upon receiving an updated property value for a style layer property of a particular label style layer of the one or more label style layers, the server computer 105 executing the mapping application 110 determines an updated display priority for each of the first label and the second label in a label pair, and re-renders the visual map such that the label boundaries for the first label and second label are rendered according to an appropriate visual style based on the updated display priority. In various embodiments, the style layer properties may be, for example, a label size property, a label overlap property, or a label position property.

The visual map typically is displayed at a particular zoom level of a plurality of possible different zoom levels. In response to receiving a change in zoom level of the visual map, the server computer 105 executing the mapping application 110 displays an updated visual map based on an updated zoom level, wherein the updated visual map includes an updated priority for the set of labels. Similar re-rendering of the visual map may occur for changes in bearing and pitch.

Other edits may be made to the labels. For example, in response to receiving input to reposition the second label to a different location in the visual map, in which the second label does not overlap with other text labels, the server computer 105 executing the mapping application 110 re-renders the label boundary for the second label in a first visual style. For example, receiving the input to reposition the second label comprises receiving input indicating dragging and dropping the second label to the different location in the visual map.

What is claimed is:

1. A method of visual identification of label collision for a digital map, comprising:
    determining a set of labels to be rendered in a visual map in a map style editor interface, wherein each label in the set of labels corresponds to a label style layer, and each label style layer comprises a set of properties indicating how to render labels that correspond to that label style layer;
    for each label in the set of labels, creating a label boundary around the label based on the set of properties of the label style layer that corresponds to the label;
    determining that two particular label boundaries of the created label boundaries overlap;
    in response to determining the two particular label boundaries overlap, determining a display priority for each of two particular labels corresponding to the two particular label boundaries based on at least one property of the label style layers corresponding to the two particular labels; and
    rendering the two particular label boundaries in the map style editor interface based on the determined display priority using a different visual style for each of the two particular label boundaries such that the two particular label boundaries are both simultaneously displayed and visually distinguishable from one another, wherein a first of the different visual styles indicates that the first label would be displayed in a displayed final digital map corresponding to the visual map, and a second visual style of the different visual styles indicates that the second label would not be displayed in the displayed final digital map corresponding to the visual map.

2. The method of claim 1, further comprising displaying the visual map.

3. The method of claim 1, wherein rendering the two particular label boundaries in the map style editor interface based on the determined display priority using a different visual style for each of the two particular label boundaries comprises rendering a first label boundary of the two particular label boundaries using a first color and rendering a second label boundary of the two particular label boundaries using a second color that is different from the first color.

4. The method of claim 1, wherein rendering the two particular label boundaries in the map style editor interface based on the determined display priority using a different visual style for each of the two particular label boundaries comprises rendering a first label boundary of the two particular label boundaries using a solid line outline and rendering a second label boundary of the two particular label boundaries using a dotted line outline.

5. The method of claim 1, further comprising:
receiving a request to display label boundaries.

6. The method of claim 1, further comprising:
receiving an updated property value for a style layer property of a particular label style layer of the one or more label style layers;
determining an updated display priority for each of the particular labels; and
re-rendering the visual map such that the label boundaries for the particular labels are each rendered according to an appropriate visual style based on the updated display priority.

7. The method of claim 6, wherein the style layer property is a label size property.

8. The method of claim 6, wherein the style layer property is a label overlap property.

9. The method of claim 6, wherein the style layer property is a label position property.

10. The method of claim 1, wherein the visual map is displayed at a particular zoom level of a plurality of different zoom levels, the method further comprising:
in response to receiving a change in zoom level of the visual map, displaying an updated visual map based on an updated zoom level, wherein the updated visual map includes an updated priority for the set of labels.

11. The method of claim 1, further comprising:
receiving input to reposition the second label to a different location in the visual map, in which the second label does not overlap with other labels; and
re-rendering the label boundary for the second label in a first visual style.

12. The method of claim 11, wherein receiving the input to reposition the second label comprises receiving input indicating dragging and dropping the second label to the different location in the visual map.

13. A server computer comprising:
one or more processors;
a memory coupled to the one or more processors and storing program instructions which, when executed using the one or more processors, cause the one or more processors to perform operations comprising:
determining a set of labels to be rendered in a visual map in a map style editor interface, wherein each label in the set of labels corresponds to a label style layer, and each label style layer comprises a set of properties indicating how to render labels that correspond to that label style layer;
for each label in the set of labels, creating a label boundary around the label based on the set of properties of the label style layer that corresponds to the label;
determining that two particular label boundaries of the created label boundaries overlap;
in response to determining the two particular label boundaries overlap, determining a display priority for each of two particular labels corresponding to the two particular label boundaries based on at least one property of the label style layers corresponding to the two particular labels; and
rendering the two particular label boundaries in the map style editor interface based on the determined display priority using a different visual style for each of the two particular label boundaries such that the two particular label boundaries are both simultaneously displayed and visually distinguishable from one another, wherein a first of the different visual styles indicates that the first label would be displayed in a displayed final digital map corresponding to the visual map, and a second visual style of the different visual styles indicates that the second label would not be displayed in the displayed final digital map corresponding to the visual map.

14. The server of claim 13, the operations further comprising displaying the visual map.

15. The server of claim 13, wherein the visual map is displayed at a particular zoom level of a plurality of different zoom levels, the operations further comprising:
in response to receiving a change in zoom level of the visual map, displaying an updated visual map based on an updated zoom level, wherein the updated visual map includes an updated priority for the set of labels.

16. The server of claim 13, the operations further comprising:
receiving input to reposition the second label to a different location in the visual map, in which the second label does not overlap with other labels; and
re-rendering the label boundary for the second label in a first visual style.

17. The server of claim 13, the operations further comprising:
receiving an updated property value for a style layer property of a particular label style layer of the one or more label style layers;
determining an updated display priority for each of the particular labels; and
re-rendering the visual map such that the label boundaries for the particular labels are each rendered according to an appropriate visual style based on the updated display priority.

18. A non-transitory computer-readable storage medium storing computer program instructions executable by one or more processors to perform operations, the operations comprising:
determining a set of labels to be rendered in a visual map in a map style editor interface, wherein each label in the set of labels corresponds to a label style layer, and each label style layer comprises a set of properties indicating how to render labels that correspond to that label style layer;
for each label in the set of labels, creating a label boundary around the label based on the set of properties of the label style layer that corresponds to the label;
determining that two particular label boundaries of the created label boundaries overlap;
in response to determining the two particular label boundaries overlap, determining a display priority for each of two particular labels corresponding to the two particular label boundaries based on at least one property of the label style layers corresponding to the two particular labels; and
rendering the two particular label boundaries in the map style editor interface based on the determined display priority using a different visual style for each of the two particular label boundaries such that the two particular label boundaries are both simultaneously displayed and visually distinguishable from one another, wherein a first of the different visual styles indicates that the first label would be displayed in a displayed final digital map corresponding to the visual map, and a second visual style of the different visual styles indicates that the second label would not be displayed in the displayed final digital map corresponding to the visual map.

19. The non-transitory computer-readable storage medium of claim 18, the operations further comprising:
receiving an updated property value for a style layer property of a particular label style layer of the one or more label style layers;
determining an updated display priority for each of the particular labels; and
re-rendering the visual map such that the label boundaries for the particular labels are each rendered according to an appropriate visual style based on the updated display priority.

20. The non-transitory computer-readable storage medium of claim 18, wherein the visual map is displayed at a particular zoom level of a plurality of different zoom levels, the operations further comprising:
in response to receiving a change in zoom level of the visual map, displaying an updated visual map based on an updated zoom level, wherein the updated visual map includes an updated priority for the set of labels.

\* \* \* \* \*